United States Patent
Boulbes et al.

(10) Patent No.: US 10,107,511 B2
(45) Date of Patent: Oct. 23, 2018

(54) METHOD AND SYSTEM FOR CONTROLLING AN ARTIFICIAL CELLAR

(71) Applicant: Cellier Domesticus Inc., L'lle-Bizard (CA)

(72) Inventors: Franck Boulbes, L'lle-Bizard (CA); Gregory Boulbes, Lyons (FR)

(73) Assignee: Cellier Domesticus Inc., L'lle-Bizard, Quebec (CA)

( * ) Notice: Subject to any disclaimer, the term of this patent is extended or adjusted under 35 U.S.C. 154(b) by 195 days.

(21) Appl. No.: 14/916,048

(22) PCT Filed: Sep. 4, 2014

(86) PCT No.: PCT/CA2014/000667
§ 371 (c)(1),
(2) Date: Mar. 2, 2016

(87) PCT Pub. No.: WO2015/031978
PCT Pub. Date: Mar. 12, 2015

(65) Prior Publication Data
US 2016/0195292 A1    Jul. 7, 2016

Related U.S. Application Data

(60) Provisional application No. 61/873,582, filed on Sep. 4, 2013.

(51) Int. Cl.
*F24F 3/14* (2006.01)
*F24F 11/00* (2018.01)
(Continued)

(52) U.S. Cl.
CPC ............ *F24F 11/0008* (2013.01); *F24F 1/02* (2013.01); *F25D 15/00* (2013.01); *F25D 29/00* (2013.01);
(Continued)

(58) Field of Classification Search
CPC ........ F24F 11/008; F24F 1/02; F24F 11/0012; F24F 2221/48; F24F 11/0015;
(Continued)

(56) References Cited

U.S. PATENT DOCUMENTS 6,145,750 A * 11/2000 Carpenter ............ F24F 11/0008
165/250
6,755,118 B1 * 6/2004 McGinty .................. C12H 1/22
426/231
(Continued)

FOREIGN PATENT DOCUMENTS

WO    2012/025337 A1    3/2012

OTHER PUBLICATIONS

International Search Report; International Searching Authority (Canadian Intelletual Property Office); International PCT Application No. PCT/CA2014/000667; dated Oct. 15, 2014; 3 pages.
(Continued)

*Primary Examiner* — Larry Furdge
(74) *Attorney, Agent, or Firm* — Taft Stettinius & Hollister LLP

(57) ABSTRACT

A method for controlling an artificial cellar, including receiving actual preservation conditions of a natural cellar, the actual preservation conditions having at least one of an actual temperature and an actual humidity within the natural cellar, and adjusting preservation conditions of the artificial cellar to substantially correspond to the received actual preservation conditions of the natural cellar.

19 Claims, 4 Drawing Sheets

(51) Int. Cl.
*G05D 22/02* (2006.01)
*F25D 29/00* (2006.01)
*G05D 23/19* (2006.01)
*G05D 27/02* (2006.01)
*F25D 15/00* (2006.01)
*F24F 1/02* (2011.01)
*F24F 11/30* (2018.01)
*F24F 110/10* (2018.01)
*F24F 110/20* (2018.01)

(52) U.S. Cl.
CPC ......... *G05D 22/02* (2013.01); *G05D 23/1902* (2013.01); *G05D 27/02* (2013.01); *F24F 11/30* (2018.01); *F24F 2110/10* (2018.01); *F24F 2110/20* (2018.01); *F24F 2221/48* (2013.01); *F25B 2700/02* (2013.01); *F25D 2331/803* (2013.01); *F25D 2700/02* (2013.01); *F25D 2700/12* (2013.01)

(58) Field of Classification Search
CPC ...... F25D 15/00; F25D 29/00; F25D 2700/02; F25D 2700/12
See application file for complete search history.

(56) References Cited

U.S. PATENT DOCUMENTS

| | | |
|---|---|---|
| 7,299,644 B2 | 11/2007 | Athanasiou et al. |
| 8,195,313 B1 | 6/2012 | Fadell et al. |
| 8,224,491 B2 | 7/2012 | Koster et al. |
| 8,710,985 B2 | 4/2014 | Shao |
| 8,950,687 B2 | 2/2015 | Bergman et al. |
| 2004/0016242 A1 | 1/2004 | Song et al. |
| 2005/0056033 A1 | 3/2005 | Gingras |
| 2006/0021513 A1 | 2/2006 | Ide |
| 2009/0309717 A1* | 12/2009 | Sipinski ............ A01M 1/2038 340/540 |
| 2010/0283573 A1 | 11/2010 | Yum et al. |
| 2012/0232969 A1 | 9/2012 | Fadell et al. |
| 2013/0030600 A1 | 1/2013 | Shetty et al. |
| 2013/0036755 A1 | 2/2013 | Kang |

OTHER PUBLICATIONS

Written Opinion; International Searching Authority (Canadian Intelletual Property Office); International PCT Application No. PCT/CA2014/000667; dated Oct. 15, 2014; 4 pages.

Panagiotis Arapitsas et al.; The Influence of Storage on the "Chemical Age" of Red Wines; Metabolomics (An Official Journal of the Metabolomics Society): ISSN 1573-3882; Feb. 22, 2014; 19 pages.

Fernando R. Mazarron et al., Exponential Sinusoidal Model for Predicting Temperature Inside Underground Wine Cellars from a Spanish Region; Energy and Buildings 40; 2008; 10 pages.

Fernando R. Mazarron et al.; Ground Thermal Inertia for Energy Efficient Building Design: A Case Study on Food Industry; Energies; ISSN 1996-1073; 2012; 16 pages.

Joseph Lstiburek; BSI-010: Wine Cellars; Building Science Corporation; http://buildingscience.com/documents/insights/bsi-010-wine-cellars; Jan. 1, 2009; 8 pages.

\* cited by examiner

METHOD AND SYSTEM FOR CONTROLLING AN ARTIFICIAL CELLAR

CROSS-REFERENCE TO RELATED APPLICATIONS

This application is a U.S. National Phase of International PCT Application No. PCT/CA2014/000667, filed on Sep. 4, 2014, which claims the benefit of U.S. Provisional Patent Application No. 61/873,582, filed on Sep. 4, 2013, the contents of each application hereby incorporated by reference in their entirety.

TECHNICAL FIELD

The present invention relates to the field of methods and system for controlling an artificial cellar, and particularly the temperature and/or humidity of an artificial cellar.

BACKGROUND

Artificial cellars such as artificial wine cellars are usually used for storing and preserving products or goods such as wine bottles, cheese, delicatessen meat, etc. Different types of artificial wine cellars exist. For example, personal wine cellars are used by individuals for storing wine bottles at home. Professional wine cellars are used by restaurants, hotels, and wineries for example, and are usually larger than personal wine cellars. While most of the personal wine cellars comprise a single room for storing the wine bottles, professional wine cellars may comprise different rooms each maintained at a specific temperature. For example, a wine cellar may comprise a first storage room for storing white wine bottles at a first temperature, and a second storage room for storing red wine bottles at a second temperature.

Wine cellars are usually adapted to maintain the wine bottles stored therein at a constant target temperature. The target temperature is usually manually set by the owner or user of the wine cellar. Therefore, the temperature within the wine cellar is maintained constant to the target temperature until the user changes the target temperature. Users usually set the target temperature according to personal preferences, but not according to an ideal storing temperature for the specific wine bottles stored in the wine cellar. While allowing to cool wine bottles, such methods for controlling a wine cellar are usually not adapted for improving the wine quality. The same applies for cellars adapted to store goods/products other than wine such as cheeses, delicatessen meat, etc.

Therefore, there is a need for an improved method and system for controlling an artificial cellar.

SUMMARY

According to a first broad aspect, there is provided a method for controlling an artificial cellar, comprising: receiving actual preservation conditions of a natural cellar, the actual preservation conditions comprising at least one of an actual temperature and an actual humidity within the natural cellar; and adjusting preservation conditions of the artificial cellar to substantially correspond to the received actual preservation conditions of the natural cellar.

In one embodiment, the actual preservation conditions correspond to preservation conditions measured in the natural cellar.

In one embodiment, the method further comprises measuring the actual preservation conditions within the natural cellar.

In one embodiment, the method further comprises: comparing the measured actual preservation conditions to previously transmitted actual preservation conditions; and transmitting the measured actual preservation conditions only when the measured actual preservation conditions are different from the previously transmitted actual preservation conditions.

In another embodiment, the actual preservation conditions correspond to simulated preservation conditions.

In one embodiment, the method further comprises calculating the simulated preservation conditions of the natural cellar.

In one embodiment, the method further comprises receiving an identification of the natural cellar and determining the actual preservation conditions according to the received identification.

In one embodiment, the step of receiving an identification of the natural cellar comprises receiving an identification of a product to be stored within the artificial wine cellar, and determining the identification of the natural wine cellar using the identification of the product.

In one embodiment, the method further comprises monitoring an energy of light within the artificial cellar and controlling an illumination within the artificial cellar using the monitored energy.

In one embodiment, the method further comprises monitoring vibrations within the artificial cellar and triggering an alert when the monitored vibrations are greater than a predetermined threshold.

In one embodiment, the method further comprises monitoring a status of a door of the artificial cellar, and triggering an alert when the status indicates that the door is opened.

In one embodiment, the natural cellar is one of a natural wine cellar, a natural cellar for storing cheese, and a natural cellar for storing delicatessen meat.

In one embodiment, the preservation conditions further comprise one of a composition of air contained within the natural cellar and a concentration of a component within the air.

According to a second broad aspect, there is provided an artificial cellar system, comprising: an artificial cellar adapted to preserve and store goods and having internal preservation conditions; a regulation device connected to the artificial cellar and adapted to control the internal preservation conditions; and a controller being in communication with the regulation device and adapted to receive actual preservation conditions of a natural cellar and control the regulation device to adjust the internal preservation conditions of the artificial cellar substantially to the actual preservation conditions of the natural cellar.

In one embodiment, the internal preservation conditions of the artificial cellar comprise at least one of an internal temperature and an internal humidity, and the preservation conditions of the natural cellar comprise at least one of a temperature and a humidity for the natural cellar.

In one embodiment, the regulation device comprises at least one temperature unit for adjusting the internal temperature and a humidity unit for adjusting the internal humidity within the artificial cellar.

In one embodiment, the temperature unit comprises at least one of a heating unit, and a cooling unit, and the humidity unit comprises at least one of a humidifier and a dehumidifier.

In one embodiment, the actual preservation conditions correspond to preservation conditions measured in the natural cellar.

In another embodiment, the actual preservation conditions correspond to simulated preservation conditions.

In one embodiment, the controller is further adapted to calculate the simulated preservation conditions of the natural cellar.

In one embodiment, the controller is further adapted to receive an identification of the natural cellar and determine the actual preservation conditions according to the received identification.

In one embodiment, the controller is further adapted to receive an identification of a product to be stored within the artificial wine cellar, and determine the identification of the natural wine cellar using the identification of the product.

In one embodiment, the artificial cellar further comprises a lighting system for illuminating an interior thereof and a photodetector for monitoring an energy of light within the artificial cellar, and the controller is further adapted to control an illumination within the artificial cellar using the monitored energy.

In one embodiment, the artificial cellar further comprises an accelerometer for monitoring vibrations within the artificial cellar and the controller is adapted to trigger an alert when the monitored vibrations are greater than a predetermined threshold.

In one embodiment, the artificial cellar further comprises a sensor for monitoring a status of a door of the artificial cellar, and the controller is adapted to trigger an alarm when the status indicates that the door is opened.

In one embodiment, the natural cellar is one of a natural wine cellar, a natural cellar for storing cheese, and a natural cellar for storing delicatessen meat.

In one embodiment, the actual preservation conditions further comprise one of an actual composition of air contained within the natural cellar and an actual concentration of a component within the air.

According to another broad aspect, there is provided a system for controlling an artificial cellar, comprising: a sensing system for monitoring actual preservation conditions of a natural cellar; and a controller in communication with a regulation device of the artificial cellar, the regulation device being adapted to control the internal preservation conditions of the artificial cellar, the control unit being adapted to adjust the internal preservation conditions of the artificial cellar substantially to the actual preservation conditions of the natural cellar.

In one embodiment, the internal preservation conditions of the artificial cellar comprise at least one of an internal temperature and an internal humidity, and the preservation conditions of the natural cellar comprise at least one of a temperature and a humidity for the natural cellar.

In one embodiment, the regulation device comprises at least one of a temperature unit for adjusting the internal temperature and a humidity unit for adjusting the internal humidity within the artificial cellar.

In one embodiment, the temperature unit comprises at least one of a heating unit and a cooling unit, and the humidity unit comprises at least one of a humidifier and a dehumidifier.

In one embodiment, the sensing system comprises at least one of a temperature sensor for monitoring the internal temperature and a humidity sensor for monitoring the actual humidity.

In one embodiment, the controller is further adapted to receive an identification of the natural cellar and determine the actual preservation conditions according to the received identification.

In one embodiment, the controller is further adapted to receive an identification of a product to be stored within the artificial wine cellar, and determine the identification of the natural wine cellar using the identification of the product.

In one embodiment, the artificial cellar further comprises a lighting system for illuminating an interior thereof and a photodetector for monitoring an energy of light within the artificial cellar, and the controller is further adapted to control an illumination within the artificial cellar using the monitored energy.

In one embodiment, the artificial cellar further comprises an accelerometer for monitoring vibrations within the artificial cellar and the controller is adapted to trigger an alert when the monitored vibrations are greater than a predetermined threshold.

In one embodiment, the artificial cellar further comprises a sensor for monitoring a status of a door of the artificial cellar, and the controller is adapted to trigger an alarm when the status indicates that the door is opened.

In one embodiment, the natural cellar is one of a natural wine cellar, a natural cellar for storing cheese, and a natural cellar for storing delicatessen meat.

In one embodiment, the actual preservation conditions further comprise one of an actual composition of air contained within the natural cellar and an actual concentration of a component within the air.

The expression "natural or passive cellar" refers to an underground storage room, such as an underground wine storage room, that is passive and not climate-controlled. Examples of natural cellars comprise underground storage rooms found in castles or mediaeval houses such as in wine regions of France. Natural cellars may also comprise a simple cave or underground tunnel that is naturally cooled and damped with minor seasonal and diurnal variations.

The expression "artificial or active cellar" refers to any room or storage space that is adapted to store products or goods such as wine bottles and that uses a climate-controlled system, particularly cooling. An artificial cellar can be a small closet, a cabinet, a dedicated room of a house, or the like. For wine producers, it could be a warehouse. Artificial cellars usually need proper insulation and appliances to cool, heat and/or humidify air.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
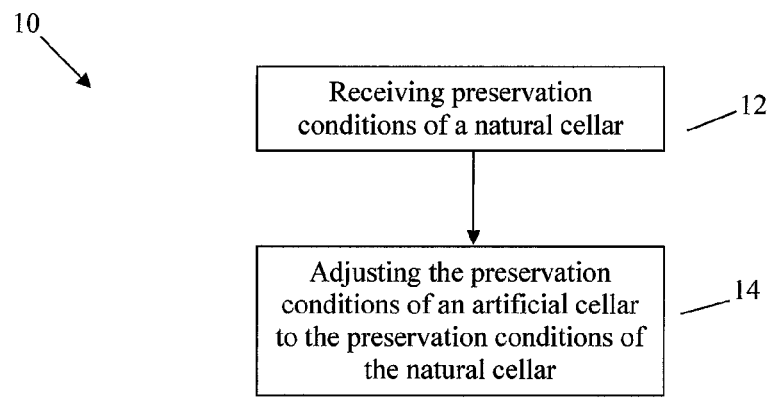
FIG. 1 is a flow chart of a method for controlling an artificial cellar, in accordance with an embodiment.

FIG. 1 illustrates one embodiment of a computer-implemented method 10 for automatically controlling an artificial cellar such as an artificial wine cellar, an artificial cheese cellar, an artificial cellar for storing, preserving, and/or aging delicatessen meats, or the like. At step 12, the preservation conditions offered by a natural cellar are received. As described below in greater detail, the preservation conditions may comprise the internal temperature within the cellar, the internal humidity within the cellar, the chemical composition of the air within the cellar, the concentration of a given chemical element (such as chlorine) present within the air contained in the cellar, and/or the like. The natural cellar may have been previously selected by the user of the artificial cellar. For example, the temperature of a corresponding natural cellar is received. When an artificial wine cellar is to be controlled, the natural cellar is a natural wine cellar; when an artificial cheese cellar is to be controlled, the natural cellar is a natural cheese cellar; when an artificial delicatessen meat cellar is to be controlled, the natural cellar is a natural delicatessen meat cellar, etc. The natural cellar may be any adequate cellar of which the preservation conditions such as the temperature and the humidity are passively adjusted through the year, and is not climate-controlled. At step 14, the received preservations conditions are applied to the artificial cellar in order to substantially reproduce within the artificial cellar the same preservations conditions as those within the natural cellar. For example, when the artificial cellar to be controlled is an artificial wine cellar, the temperature of the artificial wine cellar is adjusted to substantially correspond to the temperature of the natural wine cellar so that the wine bottles located in the artificial wine cellar be stored in substantially the same temperature conditions as the wine bottles located in the natural wine cellar. It should be understood that the same applies for artificial cellars other than wine cellars.

In one embodiment, since natural cellars are naturally adapted to improve the quality of goods/products stored therein and since the artificial cellar presents substantially the same preservation conditions as those of the natural cellar, the artificial cellar offers preservation conditions which are adapted to improve the quality of the goods/products stored therein in substantially the same way as the natural cellar. Therefore, the quality of goods/products such as wine, cheese, delicatessen meat, or the like may be improved while being stored in the artificial cellar as if they were stored in the natural cellar.

Figure 2:
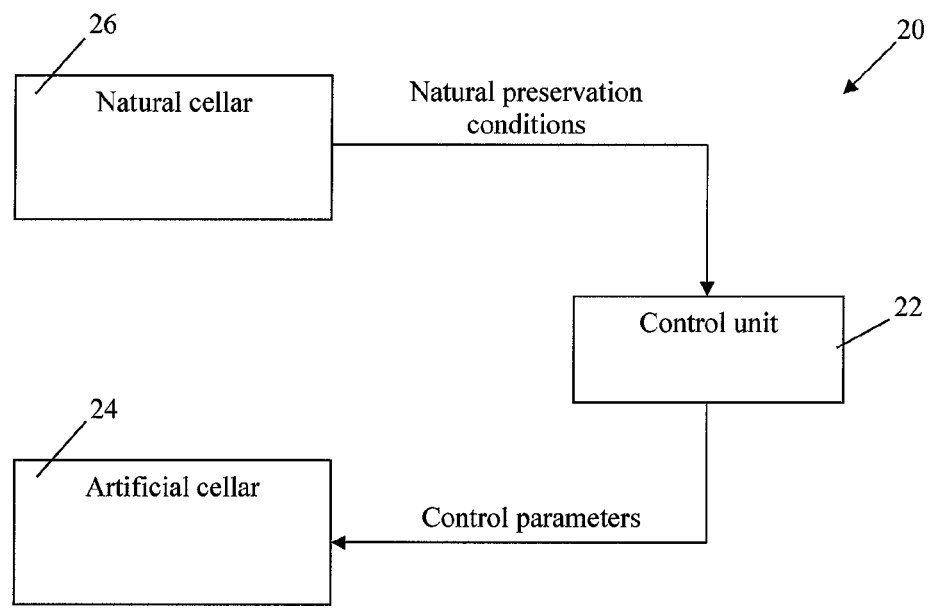
FIG. 2 is a block diagram of a general system for controlling an artificial cellar, in accordance with an embodiment.

In one embodiment, the preservation conditions received at step 12 are received locally by a control unit 22 adapted to control any devices that are physically in communication with the artificial cellar 24 and adequate to regulate the preservation conditions of the artificial cellar, as illustrated in FIG. 2. For example, the control unit 22 may adjust the temperature within the artificial cellar 24 to the temperature of the natural cellar 26 by controlling temperature adjusting devices such as a heating unit, a cooling unit, and/or the like.

In another embodiment, the control unit may be remotely located with respect to the artificial cellar 24 and be integrated within a server. In this case, the server is adapted to communicate with the temperature adjusting device of the artificial cellar 24 in order to adjust the temperature. For example, the server may be adapted to send on/off commands to the temperature adjusting device such as a heater in order to control the temperature within the artificial cellar 24. The artificial cellar 24 may comprise a temperature sensor for measuring the temperature within the artificial cellar, and the measured temperature is sent to the server which sends the on/off commands according to the measured temperature using any adequate feedback loop control technique such as a proportional-integral-derivative method.

In one embodiment, the temperature received by the artificial cellar 24 comprises a temperature of the natural cellar 26 as a function of time, i.e. a series of temperature values each corresponding to the temperature of the natural cellar taken at a respective point in time. The received temperature then corresponds to a time-dependent or time-varying temperature. The received temperature as function of time is stored locally in the controller 22 or remotely in the server, and the temperature of the artificial cellar 24 is then adjusted at each point in time to substantially correspond to the received temperature. For example, the received temperature may comprise the temperature of a natural cellar 26 measured daily over a one year period of time, i.e. a temperature value for each day of the year. The artificial wine cellar 24 then receives each day one value from a series of 365 temperature values, each one corresponding to a daily temperature of the natural cellar. In this case, the temperature of the artificial cellar 24 is adjusted daily using the received temperature as a function of time. It should be understood that the complete series of 365 temperature values may be received in a single transmission and then stored locally. Alternatively, the temperature value of the natural cellar may be received periodically, e.g. a respective one of the 365 temperature values may be received daily. It should also be understood that the temperature values may be remotely received by a server which then remotely controls the temperature of the artificial wine cellar 24 accordingly.

It should be understood that a different number of series over a year can be used and received. The number of temperature values contained in the received temperature series may vary. For example, the received temperature may comprise two values for the natural wine cellar temperature for each day over a period of one year. In this case, the temperature of the artificial wine cellar is adjusted twice a day using the received time dependent temperature. In another example, the received temperature may comprise one temperature value for each week of the year. In this case, the temperature of the artificial wine cellar is adjusted once a week.

In one embodiment, the received temperature as a function of time corresponds to a temperature physically measured in the natural cellar 26 at different points in time over a given period of time. In this case, the method 10 further comprises a step of measuring the preservation conditions such as the internal temperature and humidity within the natural cellar 26.

In another embodiment, the received temperature as a function of time corresponds to a simulated temperature. In this case, the temperature of the natural cellar 26 is simulated using an adequate mathematical model to substantially correspond to the temperature in the natural cellar, and the simulated temperature is provided to the artificial wine cellar 24 which adjusts its internal temperature accordingly. In one embodiment, the method 10 further comprises a step of calculating the simulated temperature of the natural cellar using an adequate mathematical model. The simulated temperature may be substantially continuously calculated and the temperature of the artificial cellar may be substantially continuously adjusted to correspond to the calculated temperature. In another embodiment, the simulated temperature is calculated periodically, such as once a day. In this case, the temperature of the artificial cellar is also adjusted periodically. It should be understood that the calculation of the simulated temperature may be performed locally on a controller of the temperature adjusting device, or remotely on a server which remotely controls the temperature adjusting device by transmitting on/off commands for example. It should be understood that other preservation conditions such as the internal humidity of the natural cellar 26 may also be simulated.

In another embodiment, the received temperature corresponds to an actual temperature of the natural cellar 26, which has been physically measured inside the natural cellar. In this case, the temperature in the natural cellar 26 is substantially continuously or periodically measured and sent to the artificial cellar 24 either directly or via a server. Upon reception of the measured temperature of the natural cellar 26, the temperature in the artificial cellar 24 is adjusted to substantially correspond to the received temperature. In one embodiment, the adjustment of the artificial cellar temperature is performed in substantially real-time. In another embodiment, the adjustment of the artificial cellar temperature is delayed with respect to the measurement of the natural cellar temperature. It should be understood that the same may be applied to other preservation conditions such as humidity.

In one embodiment, the temperature of the natural cellar 26 is sent to the artificial cellar 24 or the server only when the temperature actually measured within the natural cellar differs from the previously transmitted temperature of the natural cellar 26. In this case, the temperature sensor installed in the natural cellar is adapted to compare an actual measured temperature to the previous measured and transmitted temperature, and to send the actual measured temperature only if the actual measured temperature differs from the previously transmitted temperature. In this case, the temperature in the artificial cellar is only adjusted when the measurement of the natural cellar is received by the artificial cellar or the server. It should be understood that the temperature of the natural cellar may be sent to the artificial cellar or the server only when the temperature variation with respect to the previously transmitted temperature is equal to or greater than a predetermined temperature variation. It should be understood that the same may be applied to other preservation conditions such as humidity.

In one embodiment, the method 10 further comprises a step of receiving the humidity for the natural cellar. The humidity inside the artificial cellar 24 is subsequently adjusted to substantially correspond to the humidity of the natural cellar 26. In this case, the preservation or aging conditions provided by the artificial cellar 24, e.g. the temperature and humidity within the artificial cellar 24 substantially correspond to the preservation or aging conditions within the natural cellar 26.

It should be understood that, as for the temperature, the humidity within the artificial cellar 24 may be controlled by a local controller or a remote server. It should also be understood that at least some of the various embodiments described above with respect to the adjustment of the temperature in the artificial cellar 24 are applicable to the adjustment of the humidity in the artificial cellar 24.

In one embodiment, the method 10 further comprises a step of receiving an identification of a desired natural cellar. In this case, the method 10 may comprise a step of displaying a list of available natural cellars from which the user of the artificial cellar 24 can choose a given natural cellar of which the preservation conditions are to be reproduced within the artificial cellar of the user. In this case, the temperature and/or humidity of the artificial cellar is (are) adjusted according to the temperature and/or humidity of the desired natural cellar, respectively. For example, the owner of an artificial wine cellar may choose preservation/aging conditions for his artificial wine cellar to correspond to those of the Petrus Castle. In this case, the temperature and/or humidity may be measured within the natural wine cellar/cave of the Petrus Castle and sent to the artificial wine cellar, and the temperature and/or humidity of the artificial wine cellar is adjusted to substantially correspond to the received temperature and/or humidity representing the preservation/aging conditions provided by the natural wine cave of the Petrus Castle.

In another embodiment, the owner of the artificial cellar may input an identification of a specific product or good he wish to store in his artificial cellar, such as a specific wine bottle, a specific wine region to be stored in his artificial wine cellar, a specific cheese, a specific delicatessen meat, or the like. The control unit of the artificial cellar or a server to which the control unit is connected is adapted to determine a specific natural cellar of which the temperature and/or humidity are adequate for keeping the specific product or good. For example, the control unit may access a database comprising different products or goods and corresponding natural cellars for each product or good. The temperature and/or humidity conditions of the identified natural cellar are then applied to the artificial cellar. In an embodiment in which the preservation conditions are measured, the measured preservation conditions for the selected natural cellar are transmitted to the artificial cellar. In an embodiment in which the preservation conditions of the natural cellar are simulated, a simulation model that corresponds to the selected natural cellar is selected and used for determining the preservation conditions that correspond to the selected natural cellar.

It should be understood that the temperature in the artificial cellar may be adjusted using any adequate device such as a cooling unit and/or a heating unit. Similarly, it should be understood that the humidity in the artificial cellar may be adjusted using any adequate device such as a humidifier and/or a dehumidifier. It should further be understood that the artificial cellar may be provided with a fan. When the preservation conditions comprise parameters about the air of a cellar such as the concentration of a given element present in the air (e.g. oxygen, chlorine, and/or carbon dioxide), the natural cellar is provided with sensors adapted to measure the composition of the air, the concentration of a given air component, or the like, and the artificial cellar is provided with devices that are adapted to change the composition of the air within the artificial cellar such as filters, air component reservoirs such as an oxygen reservoir. In one embodiment, the composition of the air contained in the artificial cellar may be changed by controlling the composition of the water used by the humidifier. For example, when the concentration of chlorine within the air of the artificial cellar is to be controlled, the concentration of the chlorine contained in the water used by the humidifier may be changed using an adequate filter.

In one embodiment, the artificial cellar is provided with a temperature control device operatively connected thereto and adapted to cool and/or heat the interior of the artificial cellar, such as a cooling unit and/or a heating unit, and a control unit adapted to control the temperature control device for adjusting the temperature inside the artificial cellar to substantially correspond to the temperature of the corresponding natural cellar. Optionally, the artificial cellar may be further provided with a humidity control device operatively connected thereto and adapted to regulate the humidity inside the artificial cellar. In this case, the control unit is further adapted to control the humidity control device for adjusting the humidity inside the artificial cellar to substantially correspond to the humidity inside the natural cellar. The control unit is provided with a processing unit, a memory or storing unit, and a communication unit for receiving the preservation conditions of the natural cellar. The processing unit is configured for implementing the control method described therein.

In one embodiment, the control unit is positioned locally with respect to the artificial cellar. For example, the control unit may be located within the artificial cellar or adjacent to the artificial cellar. In another embodiment, the control unit is remotely located with respect to the artificial cellar. In this case, the control unit is adapted to communicate with the cooling unit, heating unit, humidifying unit, and/or dehumidifying unit in order to remotely adjust the temperature and/or humidity within the artificial cellar. For example, the control unit may be a server adapted to perform the control method described therein and being in communication with the cooling unit, heating unit, humidifying unit, and/or dehumidifying unit. For example, the server may then be adapted to send on/off commands to the cooling unit, heating unit, humidifying unit, and/or dehumidifying unit. In another example, the artificial cellar may be provided with a local controller adapted to receive the commands from the server and transmit them to the appropriate temperature and/or humidity control device. The local controller may be further adapted to receive the temperature and/or humidity measured by a temperature sensor and/or humidity sensor located within the artificial cellar, and to transmit them to the server.

In one embodiment, the control unit is adapted to receive and store in memory the preservation conditions such as the temperature of the natural cellar as function of time, e.g. a series of temperature values each for a respective point in time over a given period of time. As described above, all of the temperature values may be received in a single transmission. Alternatively, each temperature value may be received periodically. For each point in time, the received series comprises a corresponding natural cellar temperature. The control unit is then adapted to determine the actual point in time, such as the actual date or the actual date and time, and to retrieve the temperature of the natural cellar corresponding to the actual point in time. Then, the control unit sends a command indicative of the determined temperature to the temperature control device which adjusts the temperature within the artificial cellar to the determined temperature. For example, the control unit may receive 365 temperature values, each corresponding to the temperature of the natural cellar for a respective day of the year. Each day, the control unit retrieves the temperature corresponding to the actual day and controls the temperature control device to adjust the internal temperature of the artificial cellar to the retrieved temperature.

In one embodiment, the series of temperature values received by the control unit corresponds to a series of simulated temperature values. The simulated temperature values may be determined on a server for example. In another example, the received series of temperature corresponds to a series of temperature values physically measured in the natural cellar.

In another embodiment, the control unit comprises statements and instructions stored in the memory for executing a mathematical model adapted to simulate the preservation conditions such as the temperature and/or humidity of a natural cellar. The control unit is then adapted to substantially continuously or periodically calculate a temperature value and to adjust the internal temperature of the artificial cellar to the calculated temperature value, for example.

In a further embodiment, the control unit is adapted to receive substantially continuously or periodically a single temperature value. The single temperature value may correspond to a simulated temperature value that has been determined by a server for example. Alternatively, the single temperature value may correspond to a temperature value that has been physically measured in the natural cellar. Upon reception of the single temperature value, the control unit is adapted to adjust the internal temperature of the artificial cellar via the temperature control device. The control unit adjusts the internal temperature of the artificial cellar each time it receives a temperature value. When the received temperature corresponds to a physically measured temperature, it should be understood that the control unit may receive a temperature value only when the temperature sensor physically located within the natural wine cellar has detected a given temperature variation with respect to the previously transmitted temperature value.

In one embodiment, the control unit is provided with an interface for allowing the user of the artificial cellar to at least input or choose a natural cellar. The control unit then comprises a database of available natural cellars. For each available natural cellar, the database comprises an identification of respective sensors that monitor the preservation conditions within the natural cellar and/or respective mathematical models for simulating the preservation conditions of the natural cellar. The control unit is then adapted to display the list of available natural cellars. The user then selects a desired natural cellar from the list. In an embodiment in which the preservation conditions are measured, the control unit retrieves the identification of the sensors located within the selected natural cellar in order to connect to them and receive measurements therefrom. In an embodiment in which the control unit is adapted to simulate the preservation conditions for the natural cellar, the control unit is adapted to retrieve from the database the respective mathematical models and calculate the preservation conditions of the natural cellar using the retrieved mathematical models. In same or another embodiment, the user may connect to a web server which is in communication with the control unit, and input or choose the natural cellar via the web server.

While in the above description, it is described the control of the artificial cellar temperature by the control unit, it should be understood that the control unit may control other devices adapted to control other preservation conditions such as a humidity control device in a manner similar to the control of the temperature in order to adjust the other preservation conditions such as humidity within the artificial cellar. For example, the control unit may receive a time-varying humidity, i.e. a series of humidity values for different points in time over a given period of time. In this case, the control unit is adapted to retrieve, from the time-varying humidity, the target humidity for the artificial cellar, and to adjust, via the humidity control device, the humidity within the artificial cellar to the target humidity. The time-varying humidity may include simulated humidity values or humidity values previously physically measured in a natural wine cellar. In another example, the control unit is adapted to receive substantially continuously or periodically a single humidity value and adjust the humidity in the artificial cellar to the received humidity.

It should be understood that the temperature and/or humidity of a natural cellar may comprise the average temperature and/or humidity for several different natural cellars. For example, the temperature and/or humidity of a natural wine cellar used for storing Bourgogne wines may correspond to the mean or average temperature and/or humidity measured in different natural wine cellars located in the Bourgogne region. In this case, the natural cellar would be identified as a Bourgogne cellar instead of a specific natural cellar within the Bourgogne region.

While the below description refers to the control of an artificial wine cellar, it should be understood that the described method and system may also be applied for products or goods other than wine such as cheese or delicatessen meat.

Figure 3:
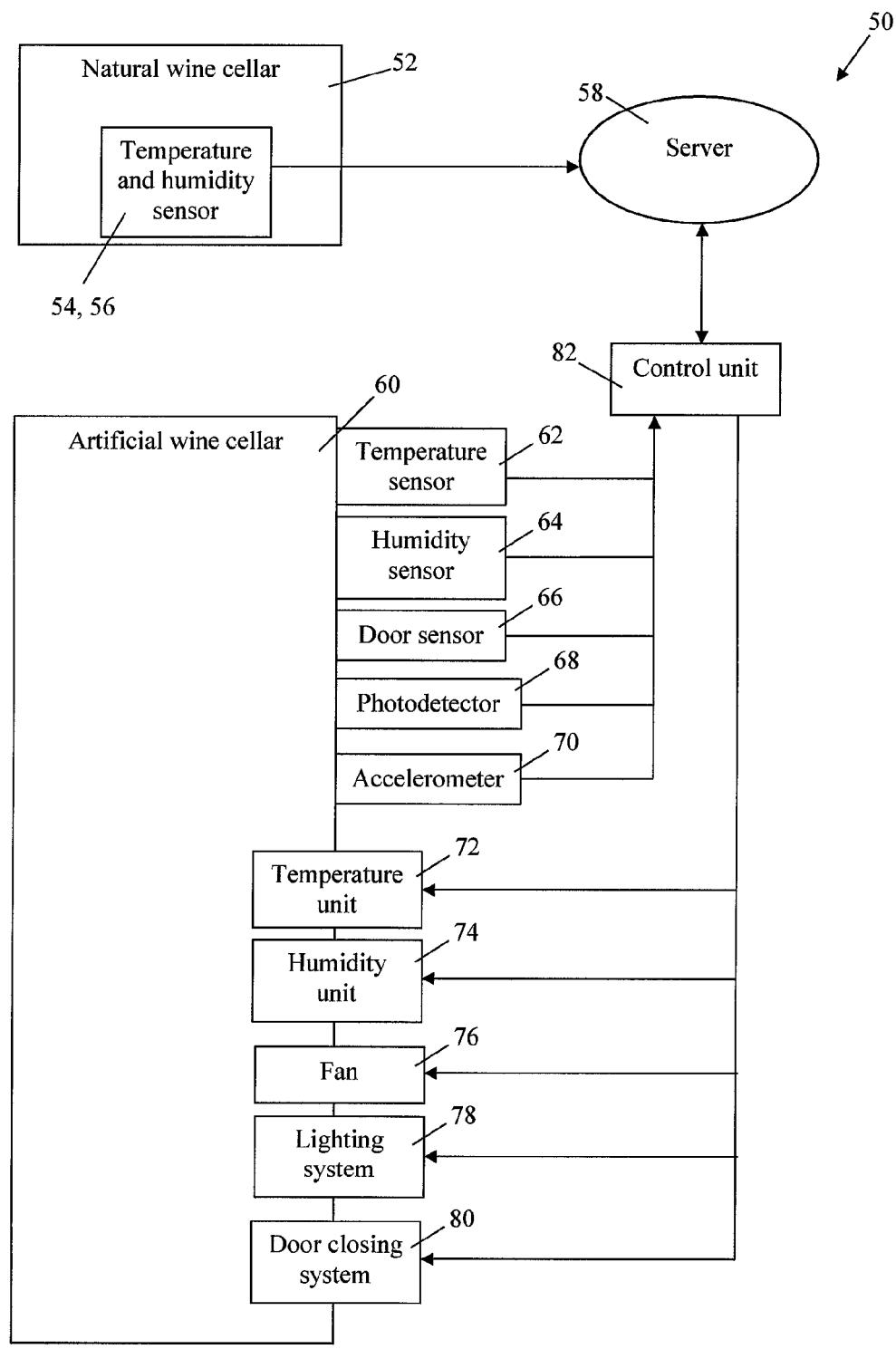
FIG. 3 is a block diagram of a specific system for controlling an artificial wine cellar, in accordance with an embodiment.

FIG. 3 illustrates an exemplary system implementation of the above-described method and system. The system 50 comprises a natural wine cellar 52 provided with a temperature sensor 54 and a humidity sensor 56 for monitoring the temperature and the humidity, respectively, within the natural wine cellar 52. The temperature sensor 54 and a humidity sensor 56 are in communication with a server 58 in order to transmit thereto the temperature and humidity values measured within the natural wine cellar 52. The system 50 further comprises an artificial wine cellar 60, a plurality of sensors 62-70 each for sensing a respective parameter or characteristics of the artificial wine cellar 60, a plurality of adjusting devices 72-80 each for adjusting a respective parameter or characteristics of the artificial wine cellar 52, and a controller or control unit 80. The control unit 80 is in communication with the sensors 62-70 for receiving measurements therefrom, and with the adjusting devices 72-80 for transmitting commands thereto. It should be understood that some of the sensors 62-70 and/or some of the adjusting devices 72-80 may be omitted from the system 50.

The sensors 62-70 comprise at least one temperature sensor 62, at least one humidity sensor, a door sensor 66, a photodetector 68, and at least one accelerometer 70. The temperature and humidity sensors 62 and 64 are each positioned at an adequate position within the artificial wine cellar 60 in order to monitor the internal temperature and humidity, respectively, within the artificial wine cellar 60. The door sensor 66 is adapted to monitor the "condition" of the door of the artificial wine cellar 60, i.e. to monitor whether the door is open, closed, or locked. The photodetector 68 is adapted to monitor the light exposure conditions for the wine bottles stored within the artificial light cellar 60 by measuring the light energy (e.g. light intensity or light power) within the artificial wine cellar 60. In one embodiment, the photodetector is adapted to measure the energy of light having a wavelength below about 520 nm. In one embodiment, the photodetector 68 is located within the artificial wine cellar 60 at an adequate location. In another embodiment, the photodetector 68 is positioned outside the artificial wine cellar 60. For example, the photodetector may be positioned adjacent to the door or a window of the artificial wine cellar while being outside the artificial wine cellar 60. The accelerometer 70 is adapted to measure acceleration in at least one direction from which vibrations and/or movements may be determined. In one embodiment, the accelerometer 70 is adapted to measure accelerations along three orthogonal axes so that vibrations and/or movements within any direction may be determined. In another embodiment, the accelerometer 70 is adapted to measure accelerations along the vertical axis since vibrations along the vertical axis usually have the most impact on the wine particles in suspension. The accelerometer 70 may be secured to the artificial wine cellar 60 or to a wine bottle stored within the artificial wine cellar 60. The sensors 62-70 are in communication with the control unit 82 so as that the measured temperature, the measured humidity, the door condition, the measured light energy, and the measured acceleration be transmitted to the control unit 82.

The adjusting devices 72-80 comprise a temperature unit 72, a humidity unit 74, a fan 76, a lighting system 78, and a door closing system 80. The temperature unit 72 is adapted to control the internal temperature within the artificial wine cellar 60, and may comprise a heating unit such as an electric heater, a cooling unit such as an air conditioning unit, and/or the like. The humidity unit 74 is adapted to control the internal humidity within the artificial wine cellar 60, and may comprise a humidifier to increase the internal humidity, a dehumidifier to decrease the internal humidity, and/or the like. The fan is adapted to blow air within the artificial wine cellar 60 to ensure a substantially homogeneous temperature and humidity within the artificial wine cellar 60. The lighting system 78 is adapted to control the lighting of the wine bottles stored in the artificial wine cellar 60. In one embodiment, the lighting system 78 comprises a light source such as light-emitting diodes (LEDs). The lighting system 78 may be positioned within the artificial wine cellar 60. Alternatively, the artificial wine cellar may comprise at least one substantially transparent portion, such as a door provided with a window, and the lighting system 78 may be positioned outside of the artificial wine cellar 60. In a further example, the lighting system 78 may comprise two lighting units of which one is located within the artificial wine cellar 60 and the other one is positioned outside the artificial wine cellar 60. In the same or another embodiment, the lighting system 78 may comprise a smart window of which the light transmission properties are adjustable in order to control the amount of external light that propagates within the artificial wine cellar 60 through the smart window. For example, all glass/window portions of the artificial wine cellar 60 such as the window of the door may be made of smart glass. The door closing system 80 is adapted to lock and unlock the door of the artificial wine cellar 80.

The adjusting devices 72-80 are each in communication with the control unit 82 so as to receive commands therefrom. The control unit is adapted to receive data indicative of the monitoring of the artificial wine cellar 60 from the sensors 62-70, and determine adequate actions to be performed by the adjusting devices 72-80, as described in greater detail below.

The control unit 82 receives the measured temperature and humidity values from the temperature and humidity sensors 54 and 56 located within the natural wine cellar 52, and transmits them to the control unit 82. The measured temperature and humidity values received by the control unit 82 correspond to target values for the artificial wine cellar 60. The control unit 82 compares the values of temperature and humidity measured within the artificial wine cellar 60 by the temperature and humidity sensors 62 and 64 to the target temperature and humidity values, i.e. the temperature and humidity values measured within the natural wine cellar 52.

If the difference between the temperature value measured within the artificial wine cellar 60 and the target temperature value is below a predefined temperature difference value, the control unit 82 does not adjust the internal temperature of the artificial wine cellar 60. If the difference between the temperature value measured within the artificial wine cellar 60 and the target temperature value is equal to or greater than the predefined temperature difference value, then the control unit 82 transmits a command to the temperature unit 72 in order to adjust the internal temperature of the artificial wine cellar 60. In one embodiment, the command is indicative of the target temperature and the temperature unit 72 automatically adjusts the internal temperature to the target temperature. In another embodiment, the command indicates to increase or decrease the internal temperature. In this case, the control unit 82 performs an adequate feedback control loop using the target temperature value and the measured internal temperature value in order to adjust the internal temperature to the target temperature.

It should be understood that, when the control unit 82 receives from the server 58 a new temperature value measured within the natural wine cellar 52, the newly received temperature value becomes the new target temperature value for the artificial wine cellar 60. It should be understood that the same may apply for humidity. In an embodiment in which it receives from the server 58 a series of target temperature values each for a respective period of time, such as a respective target temperature value for each day of the year, the control unit 82 is adapted to determine the actual period of time and retrieve the corresponding target temperature value for the artificial wine cellar 60. It should be understood that the same may apply for humidity.

If the difference between the humidity value measured within the artificial wine cellar 60 and the target humidity value is below a predefined humidity difference value, the control unit 82 does not adjust the internal humidity of the artificial wine cellar 60. If the difference between the humidity value measured within the artificial wine cellar 60 and the target humidity value is equal to or greater than the predefined humidity difference value, then the control unit 82 transmits a command to the humidity unit 74 in order to adjust the internal humidity of the artificial wine cellar 60. In one embodiment, the command is indicative of the target humidity and the humidity unit 74 automatically adjusts the internal humidity to the target temperature. In another embodiment, the command indicates to increase or decrease the internal humidity. In this case, the control unit 82 performs an adequate feedback control loop using the target humidity value and the measured internal humidity value in order to adjust the internal humidity to the target humidity.

The control unit 82 is further adapted to control the operation of the fan 76 is order to create an air flow within the artificial wine cellar 60 so as to ensure homogeneous temperature and humidity within the artificial wine cellar 60. For example, the control unit 82 may be adapted to control the on-off operation of the fan 76, the strength of the air flow, the direction of the air flow, and/or the like.

The control unit 82 is further adapted to control the lighting unit 80 in accordance with the light energy received from the photodetector 68. The control unit 82 is adapted to compare the measured light energy received from the photodetector 68 to a predefined reference light energy. When the measured light energy is below the reference light energy, the control unit 82 takes no action. However, when the measured light energy is equal to or greater than the reference light energy, the control unit sends a command to the lighting unit 78. In an embodiment in which the lighting system 78 comprises at least one light source, the command indicates to decrease the energy of the light emitted by the lighting system 78. The control unit may use a feedback control loop method for decreasing the amount of emitted energy below the reference light energy. Alternatively, the command may indicate to switch off the emission of light by the lighting system 78. In an embodiment in which the lighting system 78 comprises a smart window, the command may be indicative to decrease the transmission of light through the smart window. The lighting system 78 is then adapted to increase the opacity of the smart window in order to decrease the amount of light propagating through the smart window and reaching the wine bottles. The control unit 82 may use a feedback loop to increase the opacity of the smart window so that the measured light energy be less than the reference light energy.

In one embodiment, the control unit 82 is also adapted to control the door closing system 80. The control unit is adapted to send commands to the door closing system 80 in order to lock/unlock the door of the artificial wine cellar 60. In one embodiment, the control unit is in communication with a user interface through which a user may input commands to lock/unlock the door. Upon reception of such a command from the user interface, the control unit 82 locks/unlocks the door via the door locking system 80. In the same or another embodiment, the user may be provided with a computer device such as a personal computer, a laptop, a tablet, a smartphone, or the like, that is in communication with the server 58. In this case, the user may send a command to lock/unlock the door of the artificial wine cellar 60 to the control unit via the server 58.

In one embodiment, the control unit 82 is adapted to inform the user about the door status condition, i.e. whether the door is opened, closed, locked, or unlocked. Upon reception of the door status from the door sensor 66, the control unit 82 may indicate the status on the user interface. The control unit 82 may also transmits the door status to the server 58 which transmits a message such as a short message service (SMS) message to the user device.

In one embodiment, the control unit 82 may monitor the door status and automatically take decisions. For example, when it determines that the door has been opened for a predefined period of time, the control unit 82 sends a command that to close the door of the artificial wine cellar 60 to the door closing system 80 which closes the door upon reception of the command.

The control unit 82 is also adapted to receive acceleration measurements from the accelerometer and determine vibrations and/or movements therefrom. The vibrations may be caused by a gas or air compressor contained in the heating unit or the humidity unit of the artificial cellar. In one embodiment, the control unit 82 is adapted to compare the amplitude of the determined vibration/movement to a predefined reference value. When the determined amplitude is less than the predefined reference value, no action is taken by the control unit 82. When the determined amplitude is greater than the predefined reference value, the control unit 82 may trigger an alert. For example, the control unit 82 may send a command indicative that vibrations having an amplitude greater than the predefined reference value or threshold have been registered to the server 58, and the server 58 may send an alert message to the user via text message for example. In another embodiment, the control unit 82 is adapted to compare the amplitude of the determined vibration/movement to a predefined reference value for a predetermined period of time. In this case, the alert is triggered only when the determined vibrations are greater to the predefined reference value for the predetermined period of time. If the vibrations are greater than the predefined reference value for a period of time that is less than the predetermined period of time, then no alert is triggered.

In one embodiment, the control unit 82 is adapted to store the preservation conditions that are applied to the artificial wine cellar 60 to form a record that indicates the preservation conditions for the wine bottles that are stored in the artificial wine cellar 60. For example, the temperature, humidity, light energy, and vibrations measured by the temperature sensor 62, the humidity sensor 64, the photodetector 68, and the accelerometer 70 over the period of time during which a given wine bottle has been stored in the artificial wine cellar 60 may be stored in a record. The record may then be used to determine whether the given wine bottle has been stored in optimal conditions for its preservation and aging.

In one embodiment, the server 58 gathers information sent by the temperature and humidity sensors 54 and 56 from different natural wine cellars, and information sent by the cooling unit and humidity unit of different user artificial wine cellars. The temperature and humidity information are stored on a database. An annual routine computes the data received in order to obtain a daily average day-by-day. On each feed of a user's sensor, the server stores the temperature and humidity of the local artificial wine cellar 60, and processes programmed alerts, if needed.

The server 58 comprises a database having stored thereon a plurality of different identification of natural wine cellars 52. The identification of the natural wine cellar may correspond to a specific wine region, a specific varietal, a specific castle, a specific domain, or the like. For each natural wine cellar, corresponding temperature and humidity sensors 54 and 56 are stored in the database. The identification may comprise an IP address for example. The user connects to the server 58 using his user device via a web interface for example in order to access the list of natural wine cellars 52 stored to the database. The user then selects a desired natural wine cellar and inputs his selection via his user device. The user selection is stored by the server 58 which retrieves the identification of the temperature sensor 54 and humidity sensor 56 corresponding to the selected natural wine cellar 52. The server 58 then connects to the temperature and humidity sensors 54 and 56 in order to receive temperature and humidity measurements therefrom. The server 58 then transmits the measured temperature and humidity received to the control unit 82 of the user artificial wine cellar 60.

In one embodiment, the control unit 82 is adapted to transmit the temperature and humidity values measured by the temperature and humidity sensors 62 and 64 to the server 58 which stores these received data. The web interface may also allow the user to compare the internal temperature and humidity of his artificial wine cellar 60 to the temperature and humidity of the natural wine cellar 52 that he selected.

In one embodiment, the temperature and humidity sensors 54 and 56 send data to the server 58 periodically such as every minute, every hour, once a day, or the like. All data is stored for the first year. For the subsequent years, only daily average temperature and humidity are stored after a month.

In one embodiment, the server 58 is adapted to receive the local temperature and humidity of the artificial wine cellar 60 every minute for example. The temperature and humidity information is stored for 7 days, and then aggregated hour by hour. For information data older than one month, the aggregation is done every day by a mean temperature value and humidity value.

In one embodiment, the server 58 and the control unit 82 are separate devices. In this case, the control unit 82 comprises a communication unit for communicating with the server 58, and may be integrated within the artificial wine cellar 60 or positioned adjacent to the artificial wine cellar 60. In another embodiment, the control unit 82 is integral with the server 58, i.e. the server 58 performs the functions of the control unit 82.

The control algorithm performs various controls in order to optimize the life of the temperature unit and the humidity unit. It also allows through the web interface, a technician to force on or off the cooling and heating unit or the humidifier unit for maintenance purposes. It also optimizes the precision with a custom cut-in temperature and cut-out temperature to insure the best precision.

In one embodiment, the control algorithm performs various control steps in order to optimize the lifespan of the temperature unit and/or the humidity unit. The first step consists in a security step, i.e. the control algorithm checks the inertia of the temperature unit depending on the configuration set by the technician or by the server. The control algorithm also determines whether the temperature unit has been operating for a period of time greater than a reference period of time, and if so, an alert is sent to the technician. Depending on the configuration of the cellar, the control algorithm may also trigger the defrost cycle. The second step consists in an overdrive step, i.e. the control algorithm checks whether a technician has specified a specific instruction to the temperature unit. Via a specific instruction, a technician may force on or off the cooling and heating unit or the humidifier unit for tuning or maintenance purposes. The last step consists in a regulation step, i.e. the control algorithm performs the regulation control in order to a have a desire set point. The technician according to a proportional-integral-derivative (PID) controller defines an appropriate hysteresis setting and offset value around a set point such as the hundredth degree in order to optimize the precision of the control unit. Each connected devices can have its own cut-in and cut-out regulation in order to be the most precise in every type of cellar, thereby offering a unique (or state of the art) precision.

In one embodiment, the server 58 has two operation modes: an on-line mode and an off-line mode. When in the on-line mode, the server 58 receives temperature and humidity information of the natural wine cellar 52 from the sensors 54 and 56, and transmits it to the control unit 82. When in the off-line mode, the server 58 is adapted to calculate simulated temperature and humidity for the natural wine cellar 52 using respective adequate models and temperature and humidity information from previously received from the natural wine cellar 52. For example, the system 50 may preferably operate in on-line mode and pass from the on-line mode to the off-line when the communication between the server 58 and the temperature and humidity sensors 54 and 56 is broken. The off-line mode is therefore considered as a back-up mode.

In one embodiment, the control unit 82 has two operation modes: an on-line operation mode, and an off-line operation mode. The on-line operation mode may be the default or preferred operation mode.

When in the on-line mode, the control unit 82 receives from the target temperature and humidity for the artificial wine cellar 60, i.e. the temperature and humidity measured by the sensor and humidity sensors 54 and 56, from the server 58.

When in the off-line mode, the control unit 82 is adapted to calculate the target temperature and humidity for the artificial wine cellar 60 using respective adequate mathematical models. Alternatively, the control unit 82 may apply the last received preservation conditions when in the off-line operation mode. In this case, the control unit 82 applies the last received temperature and humidity target values to the temperature and humidity units 72 and 74. For example, the off-line operation mode may correspond to a back-up operation mode that is used by the control unit 82 when the communication between the control unit 82 and the server 58 is broken. For example, upon loss of communication with the server 58, the control unit 82 uses the last temperature and humidity values received from the server 58 to control the internal temperature and humidity of the artificial wine cellar 60 until the communication with the server 58 be recovered.

In one embodiment, the off-line operation mode is well adapted for cabinet wine cellars for which the control unit 82 replaces an original thermostat and the sensors 62 and 64 are integrated in a smaller protection enclosure. As such cabinets have less storage room, the sensors may be hidden directly inside cabinet enclosures. A stand alone cooling and/or heating unit could also replace its original thermostat with one embodiment and off-line operation mode.

When in the on-line operation mode, substantially real-time temperature and humidity setting points of a natural wine cellar are used as a reference profile to reproduce in the artificial wine cellar controlled by the control unit 82 the same conditions as in the natural wine cellar 52. This control method is different from usual thermostat in wine cellars that use a classic microcontroller with constant-in-time temperature and humidity setting points.

In one embodiment, the control unit 82 and the temperature and humidity sensors 62 and 64 provide data in streaming and control live actions of appliances, with a precision of 0.01 degree for temperature and a minute delay between each variation on the temperature and humidity units 62 and 64, and we can replicate with a substantially great precision the variations measured in the natural wine cellar 52.

In one embodiment, after a predefined period of time such as after one year of data collection, a profile of the natural wine cellar 52, such as a yearly profile, is generated and stored as a reference in order to save data storage space and web traffic. Each year could be used to replicate a specific year (e.g. reproduce a specific "millésime").

In the case of an artificial wine cellar 60 located in another hemisphere with respect to the natural wine cellar 52, e.g. an artificial wine cellar 60 located in the south hemisphere and a natural wine cellar 52 located in the north hemisphere, the temperature and humidity data may be sent to the control unit 82 of the artificial wine cellar 60 with a 6 months delay. This would have an impact on energy consumption if in summer for south hemisphere (e.g. in Australia) a controlled artificial wine cellar reproduces 6 months old data from summer in north hemisphere (e.g. Bordeaux).

In this case, for each natural wine cellar 52, an identification of its respective hemisphere is stored in the database of the server 58. The identification of the hemisphere is then used in the above-described method.

In one embodiment, the time and date at which temperature and humidity measurements are received by the server 58 from the temperature and humidity sensors 54 and 56 according to their time zone (UTC/GMT) is stored in the database of the server 58.

First, for a monitoring purpose, this will allow the user to track time of feeds at the UTC time of his artificial wine cellar 60 and not the time of his particular location and web browser he is using.

Thanks to this time and date tracking, it is possible to delay the transmission of temperature and humidity data according to UTC in order to replicate feed from the same time of the day. If an artificial wine cellar in Montreal (GMT −5H and UTC) for example is to replicate a Bordeaux (UTC+1H) based natural wine cellar, the control unit of the artificial wine cellar located in Montreal replicates the data measured by the sensors of the natural wine cellar located in Bordeaux with a 6 hours delay. Thanks to this technique, it may be possible to improve electric consumption by mapping natural day and night changes in, temperature.

In one embodiment, when in the off-line, the control unit 82 or the server 58 is adapted to calculate simulated temperature values using the following an exponential sinusoidal equation (1):

$$T_{(x,t)} = (T_m) - A_s e^{-x\sqrt{\pi/365\alpha}} \cos\left[\frac{2\pi}{365}\left(t - t_0 - \frac{x}{2}\sqrt{\frac{365}{\pi\alpha}}\right)\right] \quad (1)$$

where T(x,t) is the soil temperature (in Celsius degrees) at a depth x and time t, Tm the average soil temperature (in Celsius degrees), x the depth (in meters), t the day of year (in days, where t=0 at midnight of the $31^{st}$ of December), $t_0$, the phase constant (days), and α is the apparent thermal diffusivity (in m²/day).

In one embodiment, the control unit 82 or the server 58 computes set-points in substantially real-time instead of using data in memory. The memory may then be free to record data of sensor instead of various profiles of location and data generated by formula.

In one embodiment, the above equation (1) may reproduce virtually the temperature of any natural wine cellar in the world with only two parameters, i.e. the mean temperature and the thermal wave amplitude.

Using a simplification of equation (1) as following allows to easily program into firmware on the control unit 82 for off-line use and on the server side 58 for on-line use through the web interface:

$$y = T - A \cdot \exp(B) \cos(C \cdot (x - D)) \quad (2)$$

where y is the daily mean temperature within a natural wine cellar at a specific location (e.g.: Bordeaux, Bourgogne . . . ) according to a specific day of the year x, e.g. x=0 for the 31st December, T is the annual mean air temperature of location to generate (e.g. mean air of Bordeaux 13° C.), A is a coefficient of thermal wave amplitude at surface (e.g. 14° C.), B is a coefficient of apparent thermal diffusivity and depth of cellar (e.g. −0.3 for 1 meter, −0.6 for 2 meters), C is a constant equal to 2π/365, and D is a phase constant (e.g. 60 for Bordeaux).

For online use the profile manager also let technicians or users to calibrate parameters and tune appliances cycles depending of the wine cellar to control and reference profile chosen (e.g. B=0.3 or wave amplitude for a depth cellar replication).

In the following, there is described a sensor system 100 for monitoring parameters of an artificial wine cellar. As illustrated in FIG. 3, the sensor system 100 comprises a frame 102 having a bottle shape. The bottle frame 102 is provided with a cavity 104 extending from the neck of the bottle frame 102 to a side thereof such as the bottom of the bottle frame 102. A combined temperature and humidity sensor 106 is inserted within the cavity 104. The bottle frame 102 is further provided with a second cavity whit is connected to the first cavity 104 and extends up to a lateral side of the bottle frame 104. A photodetector 116 is inserted into the second cavity 114 at a position adjacent to the side wall of the bottle frame 102 so that ambient light may propagate up to the photodetector 116. The photodetector 116 may be protected with a transparent material such as plastic, resin, or the like. The system 100 is further provided with a controller 108 connected to the sensor 104 and photodetector 116 for computing, storage, and transmission of temperature, humidity, and light energy data received from the sensors 106 and 116. The system 100 further comprises a cap 110 adapted to be inserted into the neck of the bottle frame 102. The cap 110 is provided with at least one aperture 112 extending therethrough to allow air to enter the neck of the bottle frame 102 and reach the sensor 104.

The bottle frame may be made of any adequate material such as wood, glass, etc. The cap 110 may also be made of any adequate material such as cork, plastic, etc. The length of the cap 110 may be less than that of a usual cork cap. The cap 110 is used for hiding and protecting the sensor 104. The size of the apertures 112 is chosen so as to allow air to pass from the cellar to the bottle frame neck, thereby allowing the sensor 104 to record information on the humidity and temperature of the air contained within the artificial wine cellar. Furthermore, the cap 110 prevents some fluctuations in temperature or air (e.g. door opening of the cellar, moving bottles near probe, etc.) to deteriorate or distort the data collected.

While the cavity 104 emerges from the side of the bottle neck 102, it should be understood that other configurations may be possible. For example, the cavity may emerge from the bottom of the bottle frame 102. In one embodiment, the cavity 104 may emerge from both the side and the bottom of the bottle frame 102. In this case, the bottle frame 102 could be positioned either horizontally or vertically within the artificial wine cellar. For example, if the bottle frame 102 is positioned vertically in the cellar, a communication cable connecting the sensor 106 to the controller 108 may pass through the cavity aperture located on the side of the bottle frame.

The bottle frame with the sensor 106 is positioned at an adequate location within the artificial wine cellar and sends the collected data by the Internet via the controller 108 to the server. The server can be represented as a data manager which will analyze them in order to send specific commands to all regulation devices in the artificial cellar, and thus to impose the set point profile chosen by the user. This set point profile may correspond to data collected with the same system from a natural cave known in the world (e.g. vineyard's Chateaux in France), it can also be mathematical model based on a sinusoidal trend from a forecasting evolution of the parameters of an underground cellar. In some other application like cabinets cellars that sinusoidal model could be programmed and work as a stand-alone system when not connected to the Internet (offline) and use the available onboard memory. When in the offline mode, the user is requested to specify the actual date so that the simulation algorithm may determine the temperature and/or humidity value for the actual data.

In one embodiment, a battery and a communication unit both connected to the sensor 106 may be inserted in the cavity 104 to allow wireless communication, radio, Wi-Fi, ZigBee, radio frequency communication, near-field communication (NFC), Zwave, or Bluetooth communication, between the controller 108 and the sensor 106.

In another embodiment, the controller 108 may also be miniaturized and located within the cavity 104 of the bottle frame 102.

In one embodiment, the present design offers more accurate sensing with respect to sensing devices in which the sensor is plunged into a liquid. First reading temperature in a liquid slows changes and duty cycles of cooling systems. Therefore, as it has a large inertia, a liquid has the drawback of not showing rapid changes and not being as responsive and accurate as an air sensor. As the controller includes available connection, a bottle probe can be used as a complementary reading to the original sensor feed.

In one embodiment, the present system offers a greater precision and a complete parametric and in a real time regulation processing. Connected, our system provides an efficient and immediate alarm system and a complete tool for monitoring and storing data online. The web interface may allow the user to add personalized alarms, by editing a name, choosing a value or a variation of: temperature, humidity, electric consummation, lost of signal; and then select a frequency (10 min, 1 h, 12 h, 24 h . . . ) and the type of media (email, SMS, push). The server may then send an email, SMS, or a push to user when an alert is triggered. Ultimately our system connected to regulation appliances is unique with its natural wine cellar mapping as a set-point for temperature in an artificial wine cellar either in connected or offline configuration.

Figure 4:
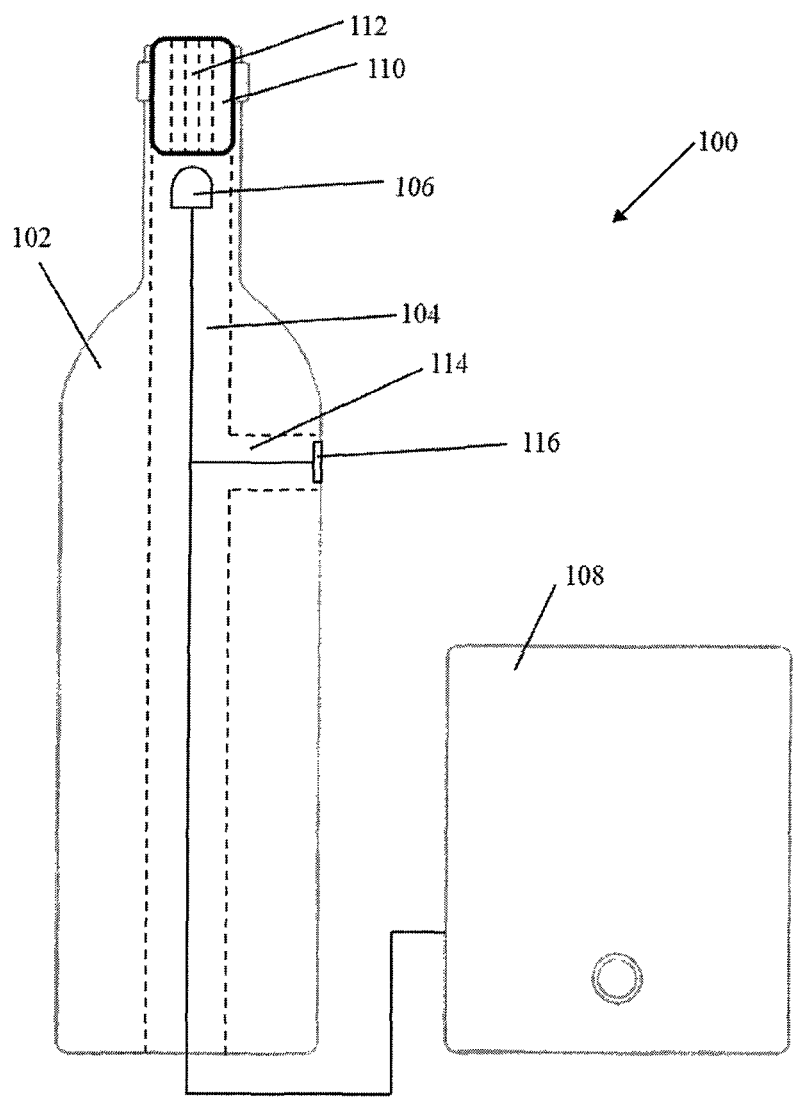
FIG. 4 illustrates a sensor system, in accordance with an embodiment.
Figure 5:
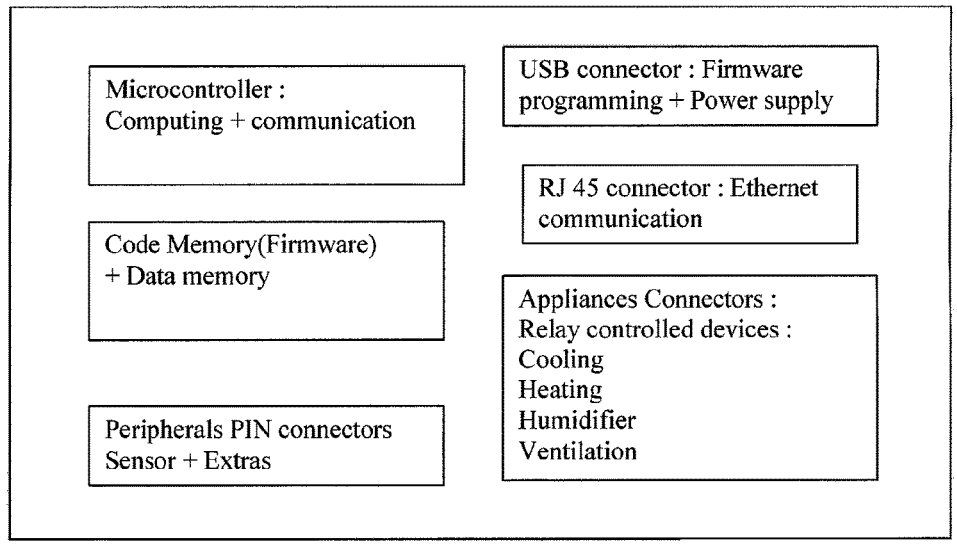
FIG. 5 is a block diagram of a first exemplary controller to be used with the system of FIG. 3.
Figure 6:
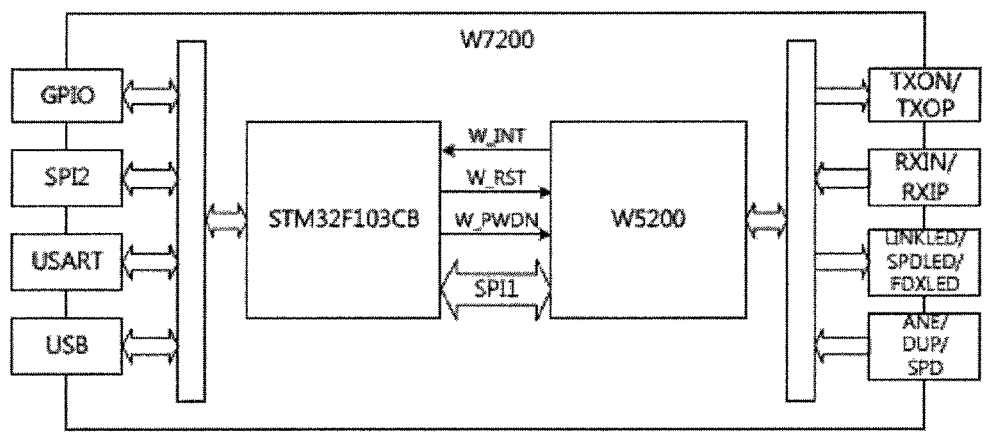
FIG. 6 is a block diagram of a second exemplary controller to be used with the system of FIG. 3.

FIG. 4 illustrates one exemplary controller to be connected to cooling unit(s), optionally to heating, ventilation or humidifier devices. The controller comprises an RJ45 connector for local area network (LAN) through a local router or modem. Connecting the device may be made using Power Line Communication (PLC) if an RJ45 output is not available in the basement. The electric wire transmits the signals to the modem or router and then communicates the data to the global network (Internet or WAN). In one embodiment, the controller may also include a backup communication based on cellular compatibility (2G/3G/4G mobile communications). In one embodiment, the controller may also communication based on Wifi.

The microcontroller MCU contained in the controller has a core cortex M3 20 KB SRAM and a TDP/IP cable. The microcontroller may be a 32-bit processor that delivers high-speed calculations (78 Mhz) for algorithms such as PID and other control loop models and enough memory for the management of the control and regulation parameters data. The TCP/IP stack and an integrated MAC & PHY Ethernet network enable secured and real-time communications through a direct RJ45 cable. It takes over TCP, IDP, IPv4, ICMP, ARP, IGMP and Pope. The internal buffer of 32 Kbytes, watchdogs and MAC address deliver the security and control needed in a sensible remote control of environmental parameter (wine bottles).

The 20 Kb RAM memory and 128 Kb of memory code can effectively treat and store data in memory like the client identifier, the control parameters of the devices and information about the environment of the cellar.

The firmware included in the code memory can read the data obtained from sensors and transmit them to a data server. The query can be of the type of any compatible server/client data communication protocol. The hit to server includes at least a specific location code, the temperature, and the humidity. For security purposes, a cryptographic or scrambling key may also be sent in the request and build by controller (e.g. a 10 digit key generated by an algorithm). The server reads data and compares them to the set point profile chosen by user, processes corrective actions to send. The server then, builds an answer parsed by controller to activate one or more relays. The relays of controller instantly command ON/OFF to the linked appliances regulating the environment of the cellar (e.g. HVAC or humidifier).

The onboard memory also allows offline uses of the equipment or "back up" system to deal directly with the information gathered by the sensor/probe without connecting to the server and the Internet. It is programmed with set point, cut-in and cut-out or other regulation algorithms known in HVAC and cooling with electronic controllers (e.g. PID) in code C, but could also be C++ or others. The cut-in and the cut-out may each correspond to a predefined temperature or variations around the target temperature. For example, the cut-in temperature may correspond to the internal temperature of the artificial wine cellar at which the cooling unit is activated, and the cut-out temperature may correspond to the internal temperature of the artificial wine cellar at which the cooling unit is stopped. A cut-in and a cut-out may also be defined for humidity.

The code also includes watchdogs, cyclic redundancy check, and an onboard or remote temperature sensor for security and high availability through a secured and parallel temperature reading. This temperature sensor can be used as a backup if original sensor fails or to trigger alerts if difference between internal and external sensor exceed a certain value. This information can be included as security check code in the query and used for internal purpose.

For online use, the RJ45 cable is used to connect the device to the Internet. A USB port allows user or installation technician to download and update the firmware code of the microprocessor MCU. In one embodiment, the system further allows a user or technician to download and update firmware directly from the Internet.

According to the user choices, the microprocessor may evolve the temperature and humidity of the cellar by preconceived algorithms. The firmware code is set on a time and date of installation. The set point varies according to a sinusoidal parameterized function in order to model and track the evolution of the temperature (or humidity) in a natural wine cellar at the setting date.

The input/output interface for the user is preferably connected to a device connected to the Internet (or equipment connected to the Internet) and a web interface to control the cellar online and therefore from a distance. The user has physically only an on/off button available on the controller wood enclosure. In the best conditions (permanent web connection etc.), the user with the help of the microprocessor can control regulation devices of the cellar on the web interface with a smartphone, Tablet or PC. The input/output interface can also be used for other analog or digital sensors, LED and other digital applications. The system can also be provided with an LCD screen and a button in order to interact directly with the controller, e.g. for offline mode used.

Through rapid connection PIN headers onboard sensors and other input/output, analog or digital output can be added (Rectangular-Connectors-Headers with Male Pins).

The sensor included in the bottle frame uses four pins (Data, Clock, +VCC and ground) on the 10 available pins. An extra 10 PIN header controlling the rest of GPIO (General Purpose Input/Output) is also available.

Devices like cooling unit(s) and generally HVAC devices are connected through the cable screw connector. A set of 8-screw terminal connector block provides sufficient connections for the wiring of the four controlled relays. For an easy connection, they are named with standards like W, Rh, Rc, Y, G, Rg, Rhm and Hm (like HVAC standard relays wiring). These cables and relays can be individually configured by firmware update and electrical wiring can be changed to another use than managing a wine cellar (24V relays wiring can are easy to use for a skilled person such as an electrician for general HVAC purpose or motors and other electrical appliances).

Furthermore, a set of jumpers is used for easy maintenance or configuration purposes such as programming firmware, reset and power source selection (USB, battery or external power supply).

The power of the whole apparatus is provided according to the configuration of the artificial wine cellar: mini-USB connector to an external power supply, directly through RJ45 connector and POE (Power Over the Ethernet), a battery or a cable plugged external power supply.

A method of powering the controller through 24V HVAC type relays could also be an alternative modification of actual board.

In one embodiment, the controller is adapted to applications in the field of geothermal energy like water and glycol fluid flow control through pipes as a temperature regulation system. Through deep wells and energy from the ground, a fluid will perfectly regulate the enclosure through piping in the cellar. It will have the great advantage of not having impact on humidity like with evaporators and HVAC systems used generally.

With this product and the service that accompanies it, the user will log to an account where all data is stored in a web server. This is known as cloud storing and is provided through a Service as a Software (SaaS). All accounts allow data monitoring about temperature, humidity, light, and vibrations through a pleasant and interactive graphs and histograms page.

In a more detailed page, a user will be able to search for specific period of time.

In another page, the user will be able to set several alerts for specific values (e.g. <16° C. or <50%), delay between alerts and type like email, SMS or push.

User with a basic control membership may configure a location or a sinusoidal evolution with the seasons as a parameter to the temperature and humidity of the cellar. The microprocessor alone or through the webserver if connected, will maintain and evolve the temperature and humidity of artificial cave (With an analytical model of a preconceived algorithms based on a sinusoidal model).

In premium membership, the system can also evaluate the difference between the measurements in the user's cellar and the data collected in the selected natural cellar, in order to bring corrective actions to the devices and reduce any gap.

Through the control interface, the user will access information about the devices, e.g. light, door lock, cooling unit and sensors temperature, humidity, light intensity and vibrations, its electric consumption and the mapping settings. The user will then be able to choose the wine cellars in great wine countries like France and even specific location and wineries such as Petrus, Dom Perignon, etc.

Basic membership users will only be able to choose an average temperature from regions like Champagne, Bordeaux, Bourgogne, Jura, etc.

The user could navigate through the different "terroirs" (e.g. Bordeaux, Bourgogne or Petrus and Dom Perignon) replication of his cellar and have different inventory zones: one controller could handle in its actual configuration up to four independent sensors and independent cooling systems (e.g. compressors). An inventory application could also provide aging information such as apogee to provide perfect time of consumption. This aging time provided by vineyards or professionals like wine critics or Sommeliers could be adjusted with a coefficient regarding the temperature profile chosen. In this case the controller 108 combine with a RFID or NFC reader in order to scan a bottle to interact with the inventory application and prove bottle is located in the artificial cellar.

A back-end or manager site will allow the settings for internal use and technician(s) of user's wine cellar. It will provide data about alerts, appliances and specific actions on the control algorithm (defrost cycle delays, hysteresis settings or offset value around set point). Specific maintenance alerts such as rapid changes on temperature or too recurrent or long cycles on compressor (e.g. signs of a poor evaporator) will also be available for technicians and internal uses. Technicians will also have privileges to force appliances to on and/or off, for calibration and maintenance purpose (e.g. force compressor to off if evaporator is suspected to leak). For example, precise and real time graphics of temperature, humidity, on/off cycles, etc. allow a technician to visualize and tune any controller on manager site. Through this method, the controller can be adapted to any use and space remotely without physical intervention from the technician.

This provides a better reliability of the temperature regulation and allows technicians to perform preventive maintenance, improve energy efficiency and reliability of appliances, and/or the like. This also helps the technician to find the best settings in order to provide a longer life to the connected units such cooling and heating.

The control parameters are set in the back-end manager site with tuning methods to set optimal behavior to best-fit space and usage. By assessing data such as rise time and settling time, technician can online do a re-calibration of control-loop program or offline with firmware through USB port or via the Internet.

In one embodiment, at least some of the artificial cellars of the prior art keep the products or goods stored therein at a substantially constant temperature and/or humidity. These preservation/aging conditions do not represent the natural preservation/aging conditions provided by a natural cellar in which the temperature and humidity fluctuates over days, months, and years. The present method and systems allows to substantially reproduce the preservation/aging conditions provided by a natural cellar within an artificial cellar, and therefore to provide products or goods stored within the artificial cellar adequate preservation/aging conditions.

In one embodiment, the recording of the parameters such as the internal temperature and humidity, the measured light energy, and/or the measured vibrations is stored in memory and accompanied the wine bottle in order to show the preservation condition is which the wine bottle was stored.

The embodiments of the invention described above are intended to be exemplary only. The scope of the invention is therefore intended to be limited solely by the scope of the appended claims.

We claim:

1. A computer-implemented method for controlling an artificial cellar, comprising:
   receiving actual preservation conditions of a natural cellar, the actual preservation conditions comprising at least one of an actual temperature and an actual humidity within the natural cellar; and
   adjusting preservation conditions of the artificial cellar to correspond to the received actual preservation conditions of the natural cellar.

2. The computer-implemented method of claim 1, wherein the actual preservation condition corresponds to preservation conditions measured in the natural cellar.

3. The computer-implemented method of claim 2, further comprising measuring the actual preservation conditions within the natural cellar.

4. The computer-implemented method of claim 3, further comprising:
   comparing the measured actual preservation conditions to previously transmitted actual preservation conditions; and
   transmitting the measured actual preservation conditions only when the measured actual preservation conditions are different from the previously transmitted actual preservation conditions.

5. The computer-implemented method of claim 1, wherein the actual preservation conditions correspond to simulated preservation conditions.

6. The computer-implemented method of claim 5, further comprising calculating the simulated preservation conditions of the natural cellar.

7. The computer-implemented method of claim 1, further comprising receiving an identification of the natural cellar and determining the actual preservation conditions according to the received identification.

8. The computer-implemented method of claim 7, wherein receiving an identification of the natural cellar comprises receiving an identification of a product to be stored within the artificial wine cellar, and determining the identification of the natural wine cellar using the identification of the product.

9. The computer-implemented method of claim 1, wherein the natural cellar is one of a natural wine cellar, a natural cellar for storing cheese, and a natural cellar for storing delicatessen meat.

10. An artificial cellar system, comprising:
    an artificial cellar adapted to preserve and store goods and having internal preservation conditions;
    a regulation device connected to the artificial cellar and adapted to control the internal preservation conditions; and
    a controller being in communication with the regulation device and adapted to receive actual preservation conditions of a natural cellar and control the regulation device to adjust the internal preservation conditions of the artificial cellar to correspond to the actual preservation conditions of the natural cellar.

11. The artificial cellar system of claim 10, wherein the internal preservation conditions of the artificial cellar comprise at least one of an internal temperature and an internal humidity, and the preservation conditions of the natural cellar comprise at least one of a temperature and a humidity for the natural cellar.

12. The artificial cellar system of claim 11, wherein the regulation device comprises at least one temperature unit for adjusting the internal temperature and a humidity unit for adjusting the internal humidity within the artificial cellar.

13. The artificial cellar system of claim 12, wherein the temperature unit comprises at least one of a heating unit, and a cooling unit, and the humidity unit comprises at least one of a humidifier and a dehumidifier.

14. The artificial cellar system of claim 10, wherein the actual preservation conditions corresponds to preservation conditions measured in the natural cellar.

15. The artificial cellar system of claim 10, wherein the actual preservation conditions correspond to simulated preservation conditions.

16. The artificial cellar system of claim 15, wherein the controller is further adapted to calculate the simulated preservation conditions of the natural cellar.

17. The artificial cellar system of claim 10, wherein the controller is further adapted to receive an identification of the natural cellar and determine the actual preservation conditions according to the received identification.

18. The artificial cellar system of claim 17, wherein the controller is further adapted to receive an identification of a product to be stored within the artificial wine cellar, and determine the identification of the natural wine cellar using the identification of the product.

19. The artificial cellar system of claim 10, wherein the natural cellar is one of a natural wine cellar, a natural cellar for storing cheese, and a natural cellar for storing delicatessen meat.

* * * * *